March 26, 1968 J. MAREZ 3,375,360

HIGH-SPEED WAVEFORM SYNTHESIZER

Filed April 29, 1964

INVENTOR.
JOHN (NMI) MAREZ

BY

ATTORNEYS

United States Patent Office 3,375,360
Patented Mar. 26, 1968

3,375,360
HIGH-SPEED WAVEFORM SYNTHESIZER
John Marez, San Diego, Calif., assignor to the United States of America as represented by the Secretary of the Navy
Filed Apr. 29, 1964, Ser. No. 363,655
3 Claims. (Cl. 235—197)

ABSTRACT OF THE DISCLOSURE

A high-speed waveform synthesizer is disclosed which may be typically employed to accept a digital type of input signal and develop therefrom appropriate deflection signals for a cathode ray tube to cause it to stroke the electron beam in order to depict symbols or alpha-numeric characters on the face of a cathode ray tube. Accordingly, the synthesizer may typically comprise X and Y axis sections and each of the X and Y axis sections contain positive and negative waveform generating means. The circuit within each of the X and Y axis sections comprises a first switching means connected to receive a first digital input signal in square wave form and is connected to a fixed amplitude positive potential source. A fixed bias means is connected to also receive the same first digital input signal and is adapted to impress a bias upon the first switching means for permitting conduction only upon a positive excursion of the first digital input signal.

A comparable second switching means is connected to receive a second digital input signal in the form of a square wave representative of digital data and is connected to a fixed amplitude of negative potential. A second bias means is connected to receive the same second digital input signal and to impress a bias upon the second switching means for permitting its conduction only upon a negative excursion of the second digital input signal. First and second integrating means are connected to the outputs to the first and second switching means to develop respective ramp signals having maximum amplitudes commensurate with the fixed amplitude positive and negative potential sources which are connected to the first and second switching means respectively. A common output circuit is connected to receive the ramp signals developed by the respective integrating means and thereby develops a composite output signal appropriate for deflection of a typical cathode ray tube employ to depict symbolic or alpha numeric characters.

The invention described herein may be manufactured and used by or for the Government of the United States of America for governmental purposes without the payment of any royalties thereon or therefor.

The present invention relates to a digital-to-stroke waveform synthesizer and more particularly, to a high-speed digital-to-stroke waveform synthesizer for use in a symbol generator.

The present day symbol generators are relatively inefficient in display systems that use a common symbol generator to generate data for many displays and where one or more computers digest display data for interpretation. The symbol generator is an important cog in the wheel of displays in general and it may be speeded up to provide more efficient utilization of computer time, data transfer time, lesson interruption of radar video on the cathode ray tube display and be more compatible with higher speed computers. In addition, a high speed symbol generator will, in general, reduce buffering equipment between the high speed computers and display systems.

An object of the present invention is to provide a practical high-speed digital-to-stroke synthesizer.

Another object of the present invention is to provide an extremely high-speed digital-to-stroke waveform synthesizer.

A further object of the invention is to provide a digital-to-stroke waveform synthesizer which will provide more efficient utilization of computer time and will minimize data transfer time.

Another object of the invention is to provide a digital-to-stroke waveform synthesizer which is compatible with high speed computers.

Various other objects and many of the attendant advantages of this invention will be readily appreciated as the same becomes better understood by reference to the following detailed description when considered in connection with the accompanying drawings wherein.

Figure 1:
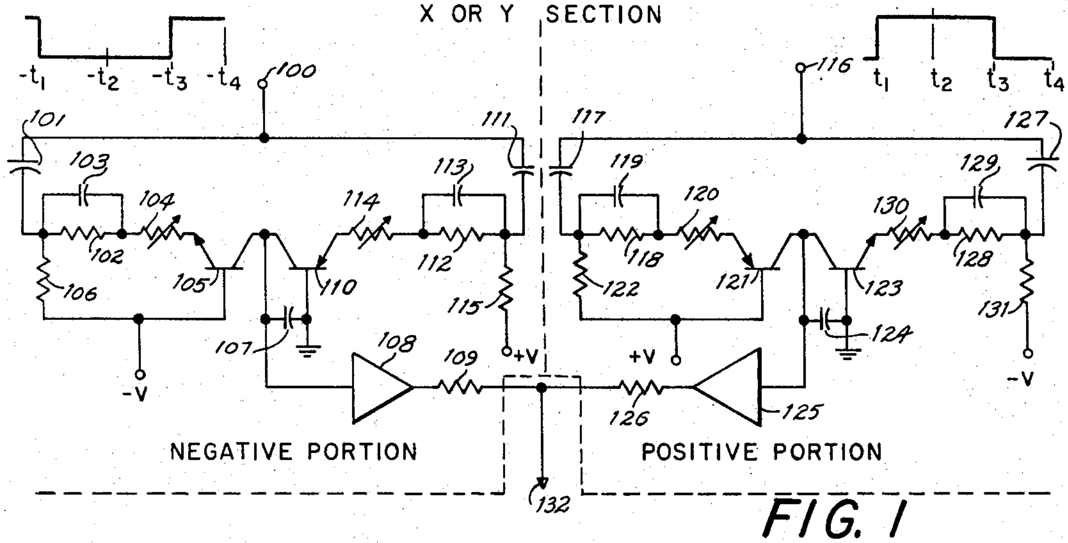
FIG. 1 is a schematic diagram of one embodiment of the present invention.

The present invention contemplates the use of an $x$ and $y$ section, each section being capable of generating an analog waveform from a digital input for use in a symbol generator. FIG. 1 merely illustrates the $x$ section in that the Y section is exactly the same and would merely constitute a duplication. Further, each of the X and Y sections of the waveform synthesizer contain a negative and positive portion.

In FIG. 1, an input 100 is adapted to receive a digital output from a computer which has coupled through logic circuits in order to decode the command word for generating the particular symbol. The input at 100 is coupled in through a coupling capacitor 101 to a resistor 102 and capacitor 103 connected in parallel and then through a slope adjusting potentiometer 104 to the emitter of a switching transistor 105. The common connection of capacitor 101 and resistor 102 is connected through a biasing resistor 106 to a source of negative voltage.

The collector of transistor 105 is connected directly to the collector of another switching transistor 110 and to one side of a charging capacitor 107. The other side of charging capacitor 107 is connected to ground and also connected to the base of the switching transistor 110. In addition, the common collectors of transistor 105 and transistor 106 are connected through a current amplifying buffer 108 to one side of a mixing resistor 109. The other side of mixing resistor 109 is connected to an output 132.

The same input at 100, previously mentioned, is also coupled through another coupling capacitor 111 to one side of a resistor 112 and capacitor 113 connected in parallel. The other side of the capacitor resistor combination 112, 113 is connected through a slope adjusting potentiometer 114 to the emitter of the switching transistor 110. The common side of coupling capacitor 111 and the RC combination 112, 113 is connected through a bias resistor 115 to a positive voltage supply.

The aforementioned description relates to the negative portion of either the X or Y section of the synthesizer.

Another input 116 is supplied for the positive portion of either the X or Y section and the positive input is coupled through a coupling capacitor 117 to another RC combination connected in parallel comprising resistor 118 and capacitor 119. The other side of the RC combination is coupled through a slope adjusting potentiometer 120 to the emitter of a switching transistor 121. The common side of the coupling capacitor 117 and the RC combination 118, 119 is connected through a bias resistor 122 to the base of the switching transistor 121 and to a positive voltage source.

The collector of switching transistor 121 is connected directly to the collector of another switching transistor 123, to one side of a charging capacitor 124 and also through a current amplifying buffer 125 to one side of a mixing resistor 126. The other side of mixing resistor 126 is connected to the output 132.

The input 116 is also coupled through a coupling capacitor 127 to one side of another RC combination comprising a resistor 128 and capacitor 129. This same side of the RC combination, resistor 128 and capacitor 129 is connected through a bias resistor 131 to a negative voltage. The other side of this combination is coupled through another slope adjusting potentiometer 130 to the emitter of the switching transistor 123. The base of the switching transistor 123 is connected to one side of the charging capacitor 124 and to ground.

In explaining the operation of the circuit only the operation of one section of FIG. 1 will be set forth in that the operation of the other section is essentially a duplicate except that the polarities of the voltages are changed. Let it be assumed that a waveform is coupled in at input 116 which is essentially a square wave which varies as a function of the absolute voltage swing. The positive ramp for the positive portion of the circuit is generated by closing switching transistor 121 and opening switching transistor 123 simultaneously, i.e. causing transistor 121 to conduct and 123 to be open essentially. This operation will cause capacitor 124 to charge at a constant current rate to some positive voltage which is determined by the circuit parameters and the input voltages. The ultimate voltage level is determined by the positive supply on the base of transistor 121. From the circuit configurations, it is seen that due to the fact that the collector of transistor 121 is connected directly to one side of the charging capacitor 124 any voltage appearing at the emitter due to forward bias of the base and emitter of the switching transistor 121 will appear at the charging capacitor 124 and that this will be the ultimate voltage level on the capacitor 124.

The negative ramp for the positive section waveform is generated by closing switching transistor 123 and opening switching transistor 121. This will cause the charging capacitor 124 to charge negative at a constant current rate through the base emitter until ground voltage is reached as a result of the base being at ground voltage and the emitter being negative relative to the base as caused by the input signal.

The positive and negative ramps of the positive section of this waveform can be changed by varying the potentiometers 120 and 130 which will, in turn, vary the slope of the waveform.

An important feature of the present invention is the fact that the waveform top or bottom level can be retained for as long as the input level remains constant. The voltage ta capacitor 124 is determined by whichever transistor, 121 or 123, is on and will remain so until the digital input changes. This means that the output at 110 will remain constant until some change is made at the input 116.

Another very distinct possibility is the provision of separate input step functions. Through the use of these step functions one could generate different output ramp slopes under signal control. Also by step functioning bias voltage for switching transistors 121 or 105, or both, one could generate different output levels. However, this is not shown in the present instance.

Figure 2:
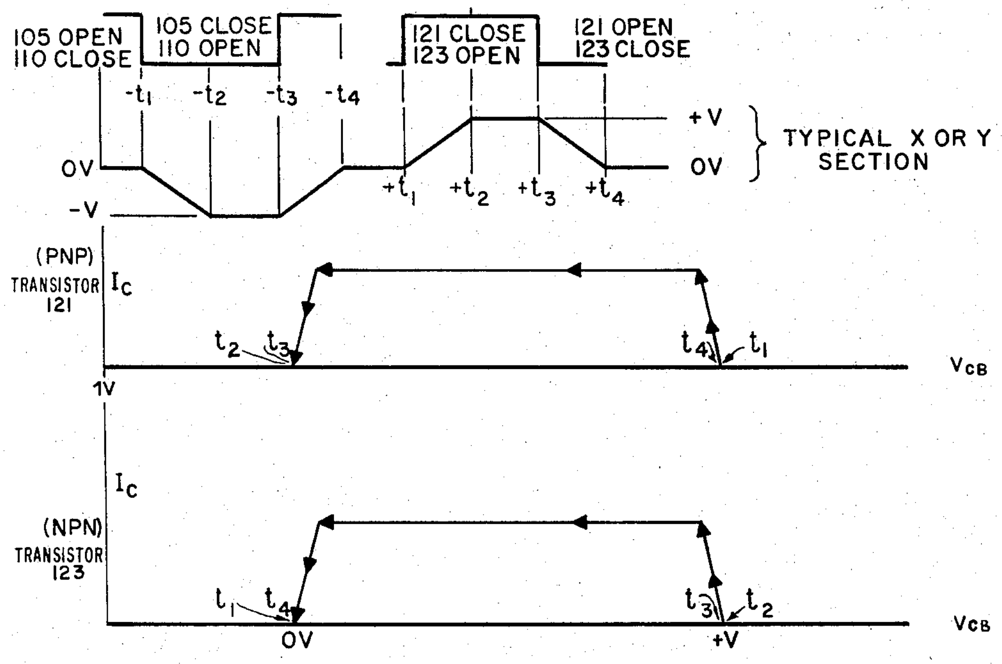
FIG. 2 illustrates the operation of one section of the synthesizer circuit graphically.

In order to illustrate the operation of the circuit in more detail reference is made to FIG. 2 which graphically illustrates and current-voltage operation of the circuit comprising transistors 121 and 123. For the purposes of this illustration exemplary voltage levels 0 and V will be used for simplicity and clarity of understanding.

At the time before $t_1$, transistor 121 collector to base is reversed biased and transistor 123 collector to base is forward biased. In addition, the $I_c$ current is also shown as being constant once the switching action has taken place.

The charging capacitor 124 is approximately charged to a +V volts potential by transistor 121 and is discharged to approximately 0 volts by transistor 123. On the T121 graph, for example, the path of operation is depicted by the arrows and the time relationship is shown with reference to the input and the output waveforms. For example, at time $t_1$ switching transistor 121 is opened and has a potential of approximately +V volts between the collector and base, and switching transistor 123 collector voltage is approximately 0 volts. At time $t_2$, transistor 121$V_{cb}$ is equal to 0 volts and transistor 123$V_{cb}$ is equal to +V. Note that at time $t_1$ plus a small amount of time, switching transistor 121 changes from no conduction to on and begins charging the capacitor 124 at a steady current rate. When $V_{cb}$ reaches approximately 0 volts the current stops flowing and the collector voltage stabilizes at $t_2$ and remains stabilized until time $t_3$. From $t_3$ to $t_4$ the capacitor is being discharged by the switching transistor 123. Note that similar operation takes place with respect to the switching transistor 123.

In the present instance, through the use of the high speed switching transistors and the fact that no RC charge rate time is involved in the generation of the waveform a high speed, ten megacycle clock rate, waveform synthesizer is attained which allows a writing speed of 100 nanoseconds per ramp slope or stroke and hence variety of symbol in 1.0 microseconds time.

The primary difference between the present technique and any previous waveform synthesizers is, as mentioned before, the extremely high rate of operation of ten megacycles. Again, this is attained through the speed of the transistors and the circuit which provides the ability to charge and discharge the storage capacitors involved at extreme rates. The previously used circuits were primarily limited by the RC charge rate times involved in that the circuits utilized an RC time constant and clamped the output. In the present instance a constant current clamp technique is utilized instead.

Obviously many modifications and variations of the present invention are possible in the light of the above teachings. It is therefore to be understood that within the scope of the appended claims the invention may be practiced otherwise than as specifically described.

What is claimed is:

1. A digital-to-stroke waveform synthesizer having X and Y axis sections, each of said X and Y axis sections containing positive and negative waveform generating means comprising:

first switching means connected to receive a first digital input signal in a substantially square wave form, said means being connected to a fixed amplitude positive potential source;

first bias means connected to receive said first digital input signal and impressing a bias upon said first switching means for permitting conduction thereby only upon a positive excursion of said first digital input signal;

second switching means connected to receive a second digital input signal in a substantially square wave form, said means being connected to a fixed amplitude negative potential source;

second bias means connected to receive said second digital input signal and impressing a bias upon said second switching means for permitting conduction thereby only upon a negative excursion of said second digital input signal;

first and second integrating means connected to the outputs of said first and second switching means, respectively; and a common output circuit connected to said integrating means for developing a composite output signal.

2. A digital-to-stroke waveform synthesizer as set forth in claim 1 and further comprising:

first slope control means connected between said first digital input signal and said first switching means;

second slope control means connected between said second digital input signal and said second switching means for controlling the degree of slope of the positive and negative ramp signals, respectively, developed therefrom.

3. A digital-to-stroke waveform synthesizer as set forth in claim 1 and further including;

a variable resistor-capacitor combination connected with each of said first and second bias means for selectively determining the turn-off and turn-on points of said first and second switching means respectively.

References Cited

UNITED STATES PATENTS

| | | | |
|---|---|---|---|
| 3,155,963 | 11/1964 | Boensel | 340—347 |
| 3,210,558 | 10/1965 | Owen | 235—183 X |
| 3,244,867 | 4/1966 | Lavin | 235—197 |
| 3,258,765 | 6/1966 | Battjes | 340—347 |
| 3,119,029 | 1/1964 | Russel | 307—88.5 |
| 3,125,694 | 3/1964 | Palthe | 307—88.5 |

OTHER REFERENCES

Millman & Taub, Pulse Digital and Switching Waveforms, McGraw-Hill, 1965, page 375.

MALCOLM A. MORRISON, *Primary Examiner.*

T. J. PAINTER, *Assistant Examiner.*